United States Patent [19]

Takayama et al.

[11] Patent Number: 4,984,100
[45] Date of Patent: Jan. 8, 1991

[54] MAGNETIC DISK APPARATUS

[75] Inventors: Norikazu Takayama; Nobuyoshi Ushijima; Tetsuzo Kobashi; Masahiko Sato, all of Odawara; Yoshihiko Yano, Hiratuka; Jun Isozaki, Kashiwa; Kousuke Fujii, Koganei; Yoshinobu Kudoh, Minamiasigara, all of Japan

[73] Assignee: Hitachi, Ltd., Tokyo, Japan

[21] Appl. No.: 380,199

[22] Filed: Jul. 14, 1989

[30] Foreign Application Priority Data

Jul. 15, 1988 [JP] Japan ................................. 63-175011
Nov. 18, 1988 [JP] Japan ................................. 63-289990

[51] Int. Cl.⁵ .............................................. G11B 5/09
[52] U.S. Cl. ....................................... 360/49; 360/40; 360/78.140
[58] Field of Search ................. 360/40, 49, 51, 77.08, 360/78.14

[56] References Cited

U.S. PATENT DOCUMENTS 4,823,212 4/1989 Khowles et al. ................. 360/77.08
4,910,617 3/1990 Brunnett et al. ................. 360/77.08
4,920,462 4/1990 Couse et al. ..................... 360/77.08

Primary Examiner—Aristotelis M. Psitos
Assistant Examiner—David L. Robertson
Attorney, Agent, or Firm—Kenyon & Kenyon

[57] ABSTRACT

A method of forming servo information in a magnetic disk apparatus of a sector servo system. Servo information is recorded in advance at the beginning of each of the sectors, and includes a DC erase signal, a track address signal and a burst signal. The track address signal indicates on which track of the magnetic disk the sector is located, and is formed by expressing the track address in Gray code and interleaving a dummy code into the Gray code. Servo information is recorded using an NRZI system or an RLL coding method. Servo information in which the dummy code is interleaved is decoded after the dummy code is removed at the time of demodulation.

19 Claims, 13 Drawing Sheets

MAGNETIC DISK APPARATUS

FIELD OF THE INVENTION

The present invention relates to a magnetic disk apparatus. More specifically, the invention relates to a magnetic disk apparatus employing a sector servo system which is capable of positioning the head at a desired position maintaining high precision and which writes servo information in a manner that realizes large capacity memory content, and further relates to the controlling of these operations.

Accompanying the trend toward decreasing the size of a magnetic disk apparatus and increasing the memory capacity, a magnetic disk apparatus of a so-called sector servo system has been proposed which does not require a specially provided magnetic disk recording surface for recording servo information for positioning the head.

The magnetic disk apparatus of the sector servo system writes servo information on the same recording surface where the data is recorded, without using the special disk and servo head that have been used for recording servo information in the past.

The conventional format for a magnetic disk apparatus employing a sector servo system includes a plurality of annular tracks which are formed concentrically on the surface of a magnetic disk, where each of the tracks is divided into a plurality of sectors. Servo information for identifying a track position in advance is written at the beginning of each sector. In general, the servo information includes three signals, i.e., a DC erase signal, a track address signal, and a burst signal.

The DC erase signal consists of a predetermined number of continuous "0" bits that indicates the beginning of the sector. In order to detect the beginning of a sector, the magnetic head reads the DC erase signal by detecting the aforementioned string of "0s". Immediately following the DC erase signal, the magnetic head detects another predetermined pattern of signals called the track address signal.

The track address signal represents a track number using, for example, a Gray code. The Gray code represents a track number by using alternating binary codes where two continuous numerical representations are different by only one numeral position. In the magnetic disk apparatus, the track address is written in such a combination that the code on a given track is different in only one position from the code written on a neighboring track. This technology has been described in detail in *IEEE Transaction on Magnetics*, Vol. MAG-14, No. 4, July, 1978. Using the Gray code, ambiguity can be confined within ±1 track even when the magnetic head is reading servo information while crossing the boundary between the tracks. The Gray codes must be so combined that they are different by only one bit from the Gray code written on a neighboring track. In a magnetic disk having 1110 tracks, for example, 11 bits are required to represent this number of tracks. In this case, furthermore, the maximum length of a string of "0s" is 11 bits.

A burst signal is used for precisely positioning the magnetic head at the center of the track. The technology to accomplish this is conventional and has been disclosed in U.S.P. No. 4,424,543.

In the conventional magnetic disk apparatus, the DC erase signal must be longer than any string of "0s" that appear in servo information, so that the magnetic head will not erroneously interpret a string of "0s" that appears in Gray code as the DC erase signal during the seeking operation. However, increasing the length of the DC erase signal results in reducing the area where data is recorded by a user, i.e., results in reducing the memory capacity of the user area, which is a reduction in the memory capacity of the magnetic disk apparatus as a whole. This is because the area for recording the DC erase signal cannot be used to record data.

In the conventional magnetic disk apparatus, the track address signals are written according to an NRZI (non-return-zero invert) system, and the data region which is the user area is written in RLL codes (run-length limited codes) such as the 2-7 RLL system. To continuously read the signals in this region, therefore, the signals must be read while switching between the reading circuits of the two systems. Because of this, read error often develops due to switching times that are out of synchronism due to variation in rotational speed.

SUMMARY OF THE INVENTION

The object of the present invention is to provide a magnetic disk apparatus which is capable of correctly reading a DC erase signal and a track address signal without error.

The second object of the present invention is to increase the memory capacity of the magnetic disk apparatus by making the length of the DC erase signal as short as possible.

The third object of the present invention is to realize the positioning of a magnetic head maintaining high precision in a magnetic disk apparatus of a sector servo system.

The fourth object of the present invention is to construct a demodulator for the signals read from the magnetic disk using a simple circuit.

The fifth object of the present invention is to provide a magnetic disk apparatus which is capable of recording user information as well as servo information using the same recording system.

The above objects are achieved using a magnetic disk apparatus of a sector servo system which limits the length of a string of "0s" in Gray code in the servo information.

According to the present invention, a dummy bit is interleaved into the Gray code track number after a predetermined interval. This interval is shorter than the length of a DC erase signal and the length of a burst signal that finely determines the magnetic head position. The dummy bit consists of a "1" bit. That is, the "1" bit necessarily appears after every interval of the predetermined length in the Gray code to limit the length of a string of "0s". A code including the dummy bit is written as a track address signal onto the magnetic disk.

The dummy bit is interleaved in the Gray code after every predetermined interval, whereby a string of "0" bits in Gray code are prevented from being longer than a required bit number. During the seeking operation, therefore, the magnetic head is prevented from erroneously detecting the track address signal as a DC erase signal. Therefore, the DC erase signal will be correctly recognized and servo information can be correctly read out. With the dummy bit being interleaved in the Gray code, furthermore, the DC erase signal does not need to be longer than the bit length of the Gray code. Therefore, servo information is prevented from becoming long, and the memory capacity of the user area can be increased.

According to the present invention, furthermore, a code that includes a dummy bit in the Gray code is used as an intermediate code which is then modified into a 2-7 RLL code and is written onto a magnetic disk. If a signal represented by conventional Gray code is simply modified into a signal of the 2-7 RLL system, there is a loss of the Gray code property (i.e., that the code on a given track differs by only one position from the codes written onto the neighboring tracks). In the present invention, however, the track address signal which contains the intermediate code that is modified into a 2-7 RLL code, has a track code that is different by only one position from that of the track address written onto the neighboring track. It is therefore possible to determine the position of the magnetic head maintaining high precision. In addition, the signal modified with the 2-7 RLL code has strings of "0s" that are limited to a maximum of 7 bits. During the seeking operation, therefore, the magnetic head is prevented from erroneously detecting the track address signal as a DC erase signal.

According to the present invention, furthermore, the track address signal is read by the magnetic head and modified into a digital signal in such a manner that the dummy bit is removed through a read circuit. This code is then modified into a binary absolute number. The dummy bit is formed so that it can be removed by a demodulator during the demodulation operation. Therefore, the speed does not decrease at the time of demodulation, and the invention can be easily realized by providing a conventional demodulator with a simply constructed circuit for removing dummy bits.

BRIEF DESCRIPTION OF THE DRAWINGS

FIGS. 2A and 2B are diagrams showing Gray codes written onto a track address portion 5, wherein FIG. 2A shows signals in a track address portion 11 in a conventional magnetic disk apparatus, and FIG. 2B shows signals in the track address portion 5 according to the embodiment of FIG. 1;

DETAILED DESCRIPTION

Embodiments of the invention will now be described in conjunction with the drawings.

Figure 3:
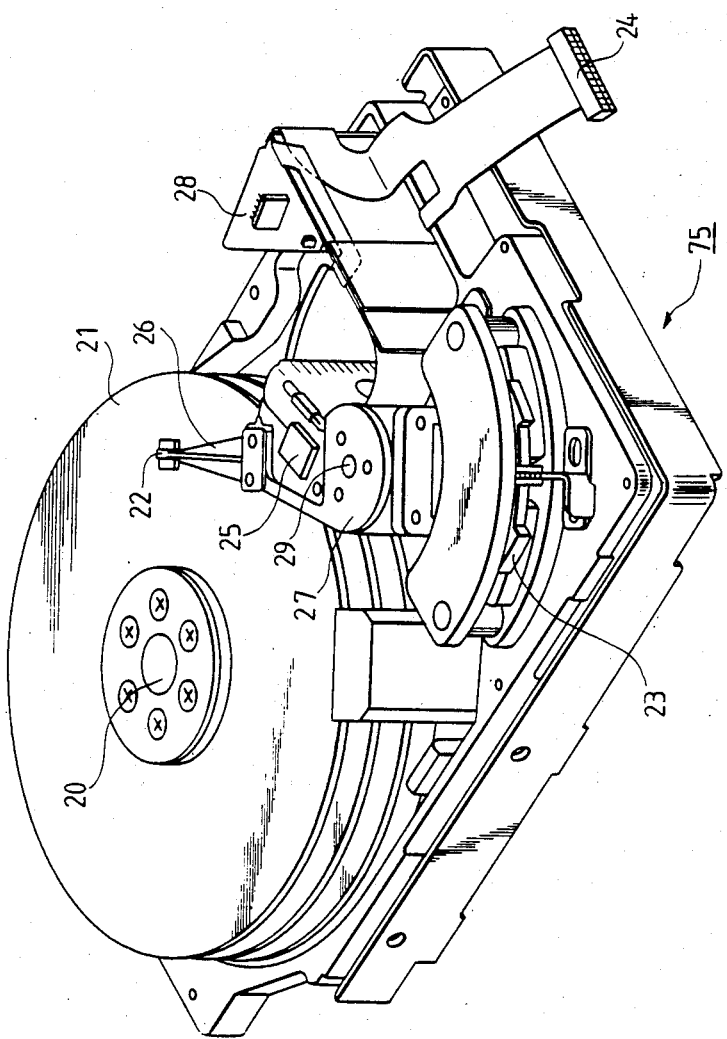
FIG. 3 is a perspective view showing the whole magnetic disk apparatus according to the first embodiment of FIG. 1.

FIG. 3 is a perspective view illustrating the whole magnetic disk apparatus 75 according to one embodiment of the present invention.

A hub 20 secures a plurality of disks 21 in a stacked manner, and a brushless DC motor (not shown) is arranged in the hub 20. The brushless DC motor rotates the disk 21 at a speed of, for example, 3600 rpm ±1%. The disk 21 includes an aluminum substrate on which a magnetic recording film is formed by, for example, sputtering. A plurality of concentric tracks are formed on the recording surface of the disk 21, each track is divided into a plurality of predetermined frames. The frames are called sectors. Each sector consists of an area at the beginning portion thereof for recording servo information and a subsequent user area on which the data can be written by a user. Servo information is recorded in advance on the servo information area.

A magnetic head 22 is a transducer which reads and writes data onto the disk 21. The transducer is secured onto a precision slider made of a material such as a ferrite or a ceramic, and is composed as a whole structure. A head suspension 26 supports the magnetic head 22 and has at one end the magnetic head 22 and is secured at its other end by a head arm 27 which is mounted on a shaft 29. The magnetic head 22 swings in an arc with the shaft 29 as its center. A VCM (voice coil motor) 23 is used for driving the head arm 27.

A head amplifier 25 amplifies a signal read by the head 22 and converts a current signal into a voltage signal. An FPC (flexible printed circuit) 28 transmits signals amplified by the head amplifier 25 and data that is to be recorded onto the disk 21. The head amplifier 25 and various IC's are mounted on the FPC 28.

Figure 1:
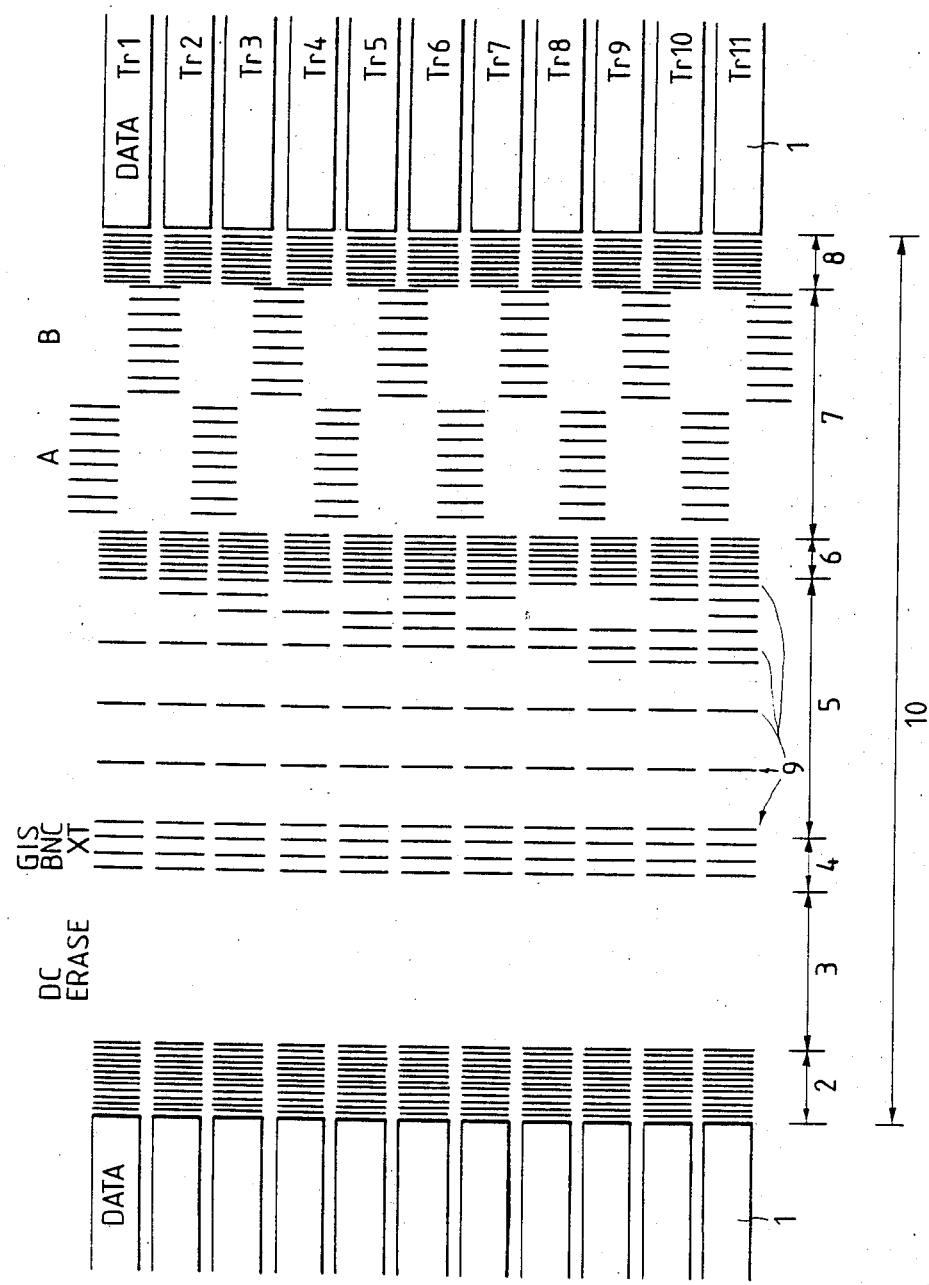
FIG. 1 is a diagram which explains in detail servo information recorded on a magnetic disk apparatus according to a first embodiment of the present invention.

FIG. 1 is a diagram for explaining in detail the servo information area of each sector according to one embodiment of the present invention. The servo information area is chiefly shown spreading over a plurality of tracks. Each sector is divided into a servo information area 10 and a user area 1.

The servo information area 10 consists of a DC erase portion 3 which represents the beginning of a sector, timing signal portions 2, 6 and 8 for keeping read timings, an index signal portion 4 which includes a signal that represents the beginning of a sector, a track address portion 5 where a track number is written as a Gray code and a burst signal portion 7 for finely determining the position of the magnetic head.

In the DC erase portion 3 is a string of "0" bits, e.g., a string of 24 "0" bits. In the NRZI system, this portion contains no signals without magnetic inversion.

Data is recorded on the user area 1 by a user, for example, in 2-7 RLL codes.

Signals are written on the timing signal portions 2, 6 and 8 for determining the read timings and read gains. They consist of a string of "1" bits. In this embodiment, the data is recorded onto the user area 1 using 2-7 RLL codes, and servo information is recorded using the NRZI system. Therefore, the timing signal portions 2, 6 and 8 are also used for keeping timing while switching the read mode between RLL and NRZI.

Index signals are written on the index signal portion 4 for identifying the number of the sector on the track. After the DC erase portion 3 is detected by the magnetic head 22, the index signal is detected to find the beginning of the sector.

Signals for finely positioning the head are written on the burst signal portion 7. The two kinds of signals, A and B, are written so that they span over neighboring tracks. The magnetic head reads the A and B signals and compares the levels of the two burst signals that are read to determine whether the head has deviated from the central position of the track or not.

Figure 2:
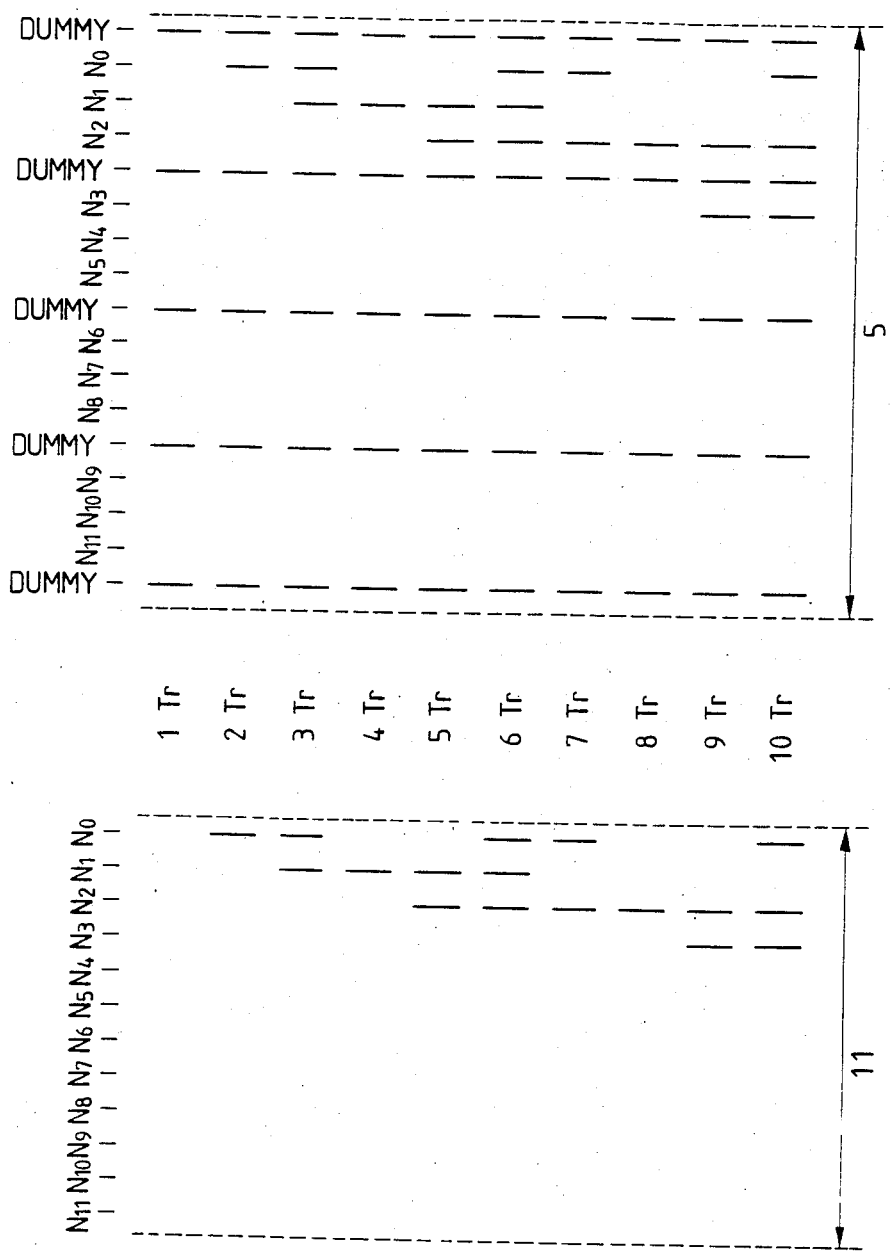

On the track address portion 5, track address signals are recorded in a manner where a dummy bit "1" is interleaved after every three bits in the Gray code which consists of, for example, 12 bits. This is a feature of the present invention and will be described in further detail in conjunction with FIGS. 2A and 2B.

FIGS. 2A and 2B are diagrams showing Gray codes written in the track address portion 5, wherein FIG. 2A shows signals in the track address portion of a conventional magnetic disk apparatus, and FIG. 2B shows signals in the track address portion according to an embodiment of the present invention. Many tracks are formed on the disk 21. In FIGS. 2A and 2B, however, ten tracks, i.e., track 1 through track 10 are shown for easy explanation. In the drawings, furthermore, dotted lines are shown to indicate the ranges of track address portions 5 and 11.

In the conventional apparatus as shown in FIG. 2A, a sector number is written in the track address portion 11 using a Gray code consisting of 12 bits $N_{11}$ to $N_0$. As will be obvious from the drawing, the first track consists of a string of 12 "0s". The DC erase portion 3 also consists of a string of "0s". Therefore, in order for the track address portion 5 to be correctly recognized, the DC erase portion 3 must have a bit length sufficiently greater than that of the track address portion 5.

In the track address portion 5 of the present embodiment, on the other hand, a "1" bit is inserted after every three bits in the Gray code which again consists of 12 bits $N_{11}$ to $N_0$. That is, referring to FIG. 2B, the dummy bit "1" is interleaved before bit $N_{11}$, between bit $N_9$ and bit $N_8$, between bit $N_6$ and bit $N_5$, between bit $N_3$ and bit $N_2$, and after bit $N_0$. According to this embodiment, therefore, the total bit number in the track address portion 7 becomes 17 in contrast with 12 bits in FIG. 2A. In the track address portion 5, however, a maximum string of three "0s" is allowed. Therefore, if the DC erase portion 3 has a length greater than 4 bits, the DC erase portion 3 will not be incorrectly recognized as the track address portion 5. Here, the dummy bit is interleaved before bit $N_{11}$ and after bit $N_0$, such that the boundary relative to the index signal portion 6 can be easily identified or such that the demodulation can be easily effected. Therefore, it is not necessary for the dummy bit to be interleaved in these portions to get this benefit of the present invention.

Figure 4:
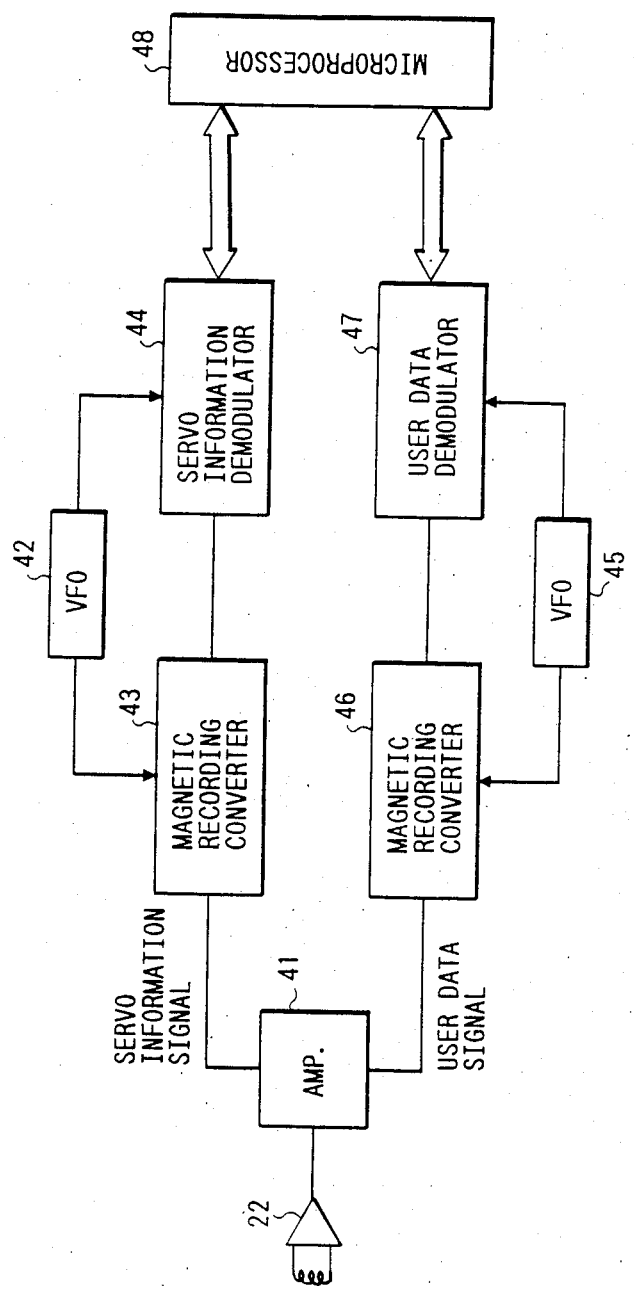
FIG. 4 is a block diagram of a demodulator in the magnetic disk apparatus according to the embodiment of FIG. 3.

FIG. 4 is a block diagram illustrating a demodulator used in the magnetic disk apparatus according to the embodiment of FIG. 1.

The analog signal read from the magnetic head 22 is amplified through an amplifier circuit 41 which includes a head amplifier 25. The signals amplified through the amplifier circuit 41 are grouped into servo information signals and user data signals which are then input to magnetic recording converter circuits 43 and 46. VFO's (variable frequency oscillators) 42 generate clocks that serve as references in response to input signals. In FIG. 4, two VFO's are used since servo information signals and user data signals are written in different ways. The magnetic recording converter 43 converts the amplified servo information signals into digital signals. The dummy bits are removed from the digitized servo information signals through a servo information demodulator 44. As a result, the servo information signals are demodulated into a binary signal sequence and are recognized by a microprocessor 48. The magnetic recording converter 46 converts the amplified user data signals into digital signals. The digitized user data signals are input to the user data demodulator 47 in which the 2-7 RLL codes are demodulated into a binary signal sequence and are recognized by the microprocessor 48. The microprocessor 48 finds the difference between the recognized track number and a desired track, increases or decreases a drive current supplied to the VCM 23 depending upon the difference, and positions the magnetic head 22 on the desired track.

Figure 5:
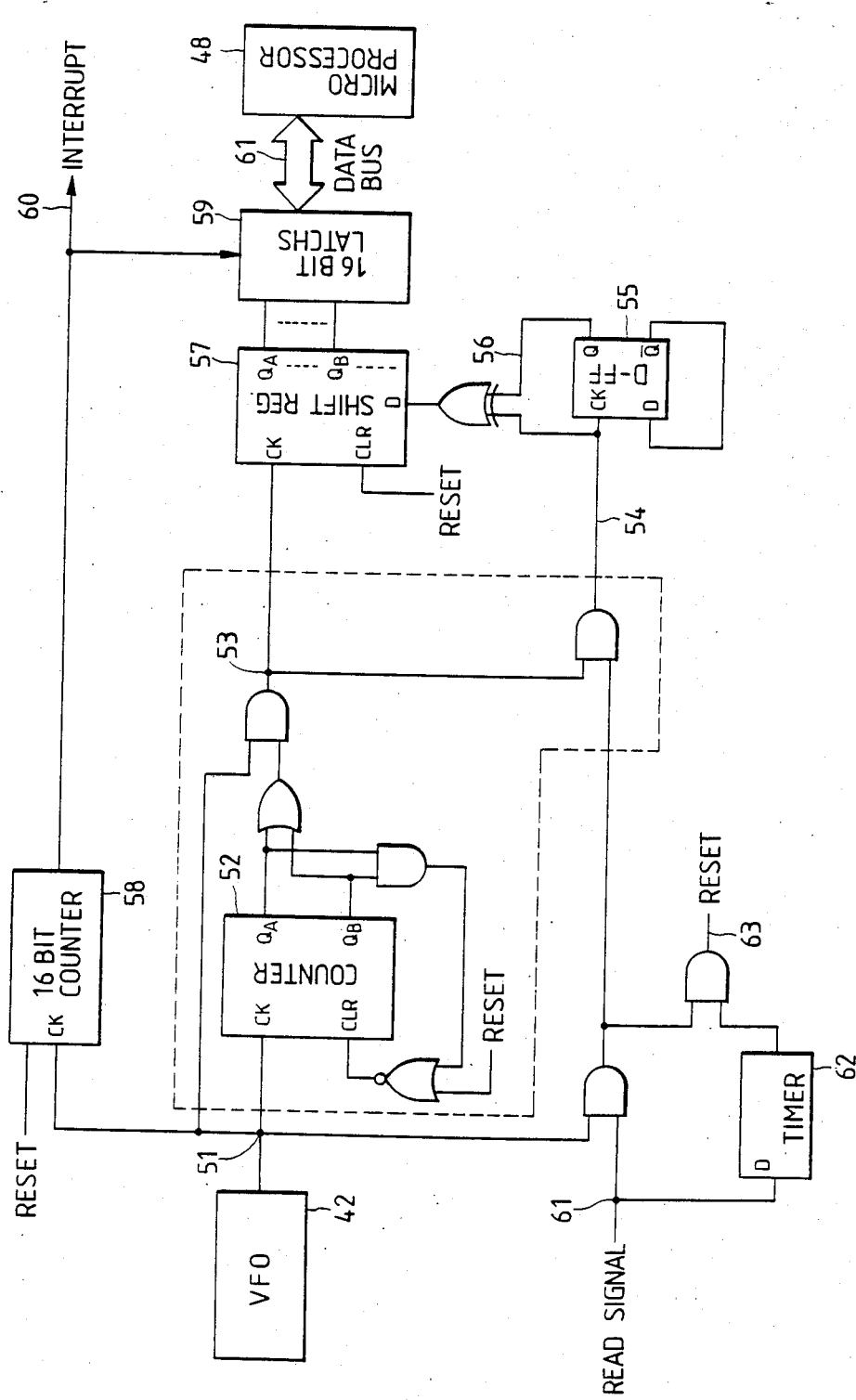
FIG. 5 is a block diagram of a servo information demodulator 44 of FIG. 4.

Next, the servo information demodulator 44 will be described in detail in conjunction with FIG. 5. In the embodiment of FIG. 2B, a total of five dummy bits are interleaved in the Gray code and must, hence, be removed at the time of demodulation. The dummy bits can be removed in a software manner using a microprogram. In this embodiment, however, the dummy bits are removed using hardware. In FIG. 5, the portion surrounded by a dotted line is newly added to a conventional servo information demodulator.

As the read signal 61 read by the magnetic head 22 and amplified through the head amplifier 25 is detected to contain no signals, i.e., as the DC erase signal is detected, a delay timer 62 starts to operate. The delay timer 62 produces a "1" bit after a predetermined period of time has passed. As the delay timer 62 produces a "1" and the read signal 61 becomes a "1", a reset signal 63 is generated. The reset signal 63 clears the circuit that removes dummy bits and clears the circuit that recognizes Gray codes. Here, the timing of the read signal 61 for picking up the data is based upon the logical product with a signal 51 generated by the VFO 42.

Next, use is made of a 4-bit counter 52 such that a dummy bit mask clock 53 is formed from the signal 51 that is generated by the VFO 42. The dummy bit mask clock 53 is generated at a rate of one after every four signals 51 generated by the VFO 42, and a signal sequence 54 free of dummy bits is formed based on the logical product of the read signal 61 and the signal 51 generated by VFO 42. The signal sequence 54 is the same as that of conventional Gray codes.

Figure 6:
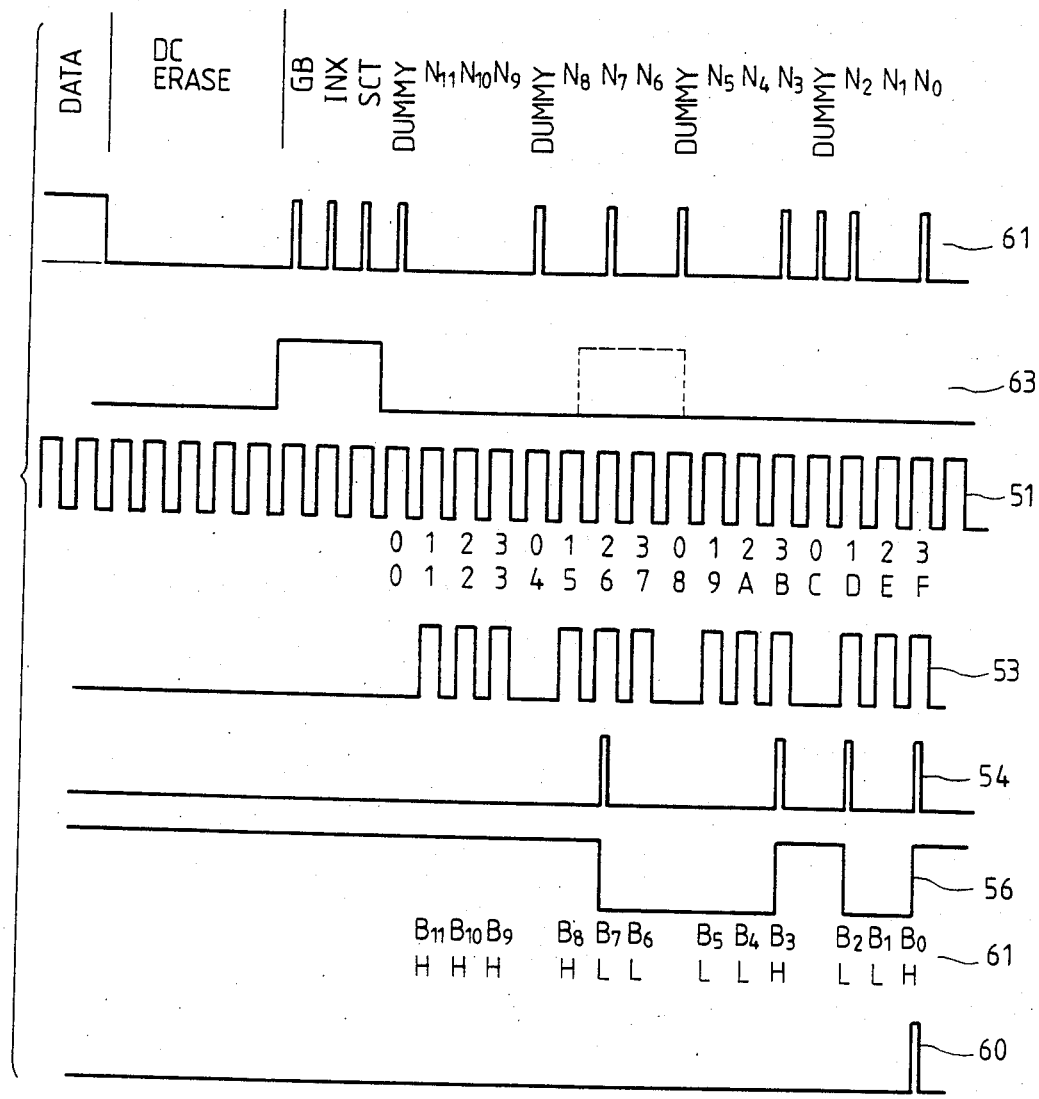
FIG. 6 is a timing chart for explaining the operation of the servo information demodulator 44 of FIG. 5.

The Gray codes are then modified into an absolute address sequence, i.e., a binary code sequence. As the signal sequence 54 is being input to the clock input of the D-type flip-flop 55, the output bit thereof is inverted for every bit condition in the signal sequence 54, and a signal sequence 56 is formed. Furthermore, a signal based on the exclusive logical sum of the signal sequence 56 and the signal sequence 54 is input to a data input of a 16-bit shift register 57. The dummy mask clock 53 is input to the clock input of the 16-bit shift register 57. An output is taken from a predetermined bit of the 16-bit shift register 57 after the serial-parallel conversion is completed. The conversion of the read signal into a binary signal is now completed. The microprocessor 48 reads signals which are arranged in the form of an absolute address sequence via a data bus 61 in order to identify a track number. The wave forms of the signals of FIG. 5 are shown in FIG. 6.

As described above, the track address signals including dummy bits are easily demodulated by removing dummy bits using a conventional Gray code demodulator with an added circuit consisting of a delay timer and the associated circuitry shown in FIG. 5.

The servo information writing device will now be described in conjunction with FIGS. 7 and 8.

Figure 7:
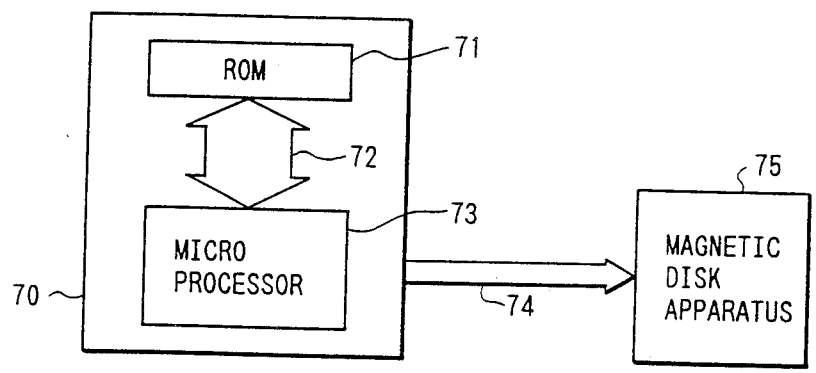
FIG. 7 is a block diagram which schematically illustrates a servo information write apparatus for writing servo information onto the magnetic disk apparatus according to the embodiment of FIG. 1.

FIG. 7 is a schematic block diagram of the servo information writing device for writing servo information onto the magnetic disk apparatus according to the embodiment of FIGS. 1–6. The servo information writing device 70 includes a ROM 71 and a microprocessor 73. The track number is stored in the form of Gray codes in the ROM 71. Gray codes of the track number are read out via a data bus 72, and the servo information writing device 70 forms Gray codes including dummy bits based thereupon. The microprocessor 73 supplies the magnetic disk apparatus 75 shown in FIG. 3 with a magnetic head movement control signal as well as servo information via a signal line 74. The magnetic disk apparatus 75 writes servo information on the disk 21 using the magnetic head 22.

Figure 8:
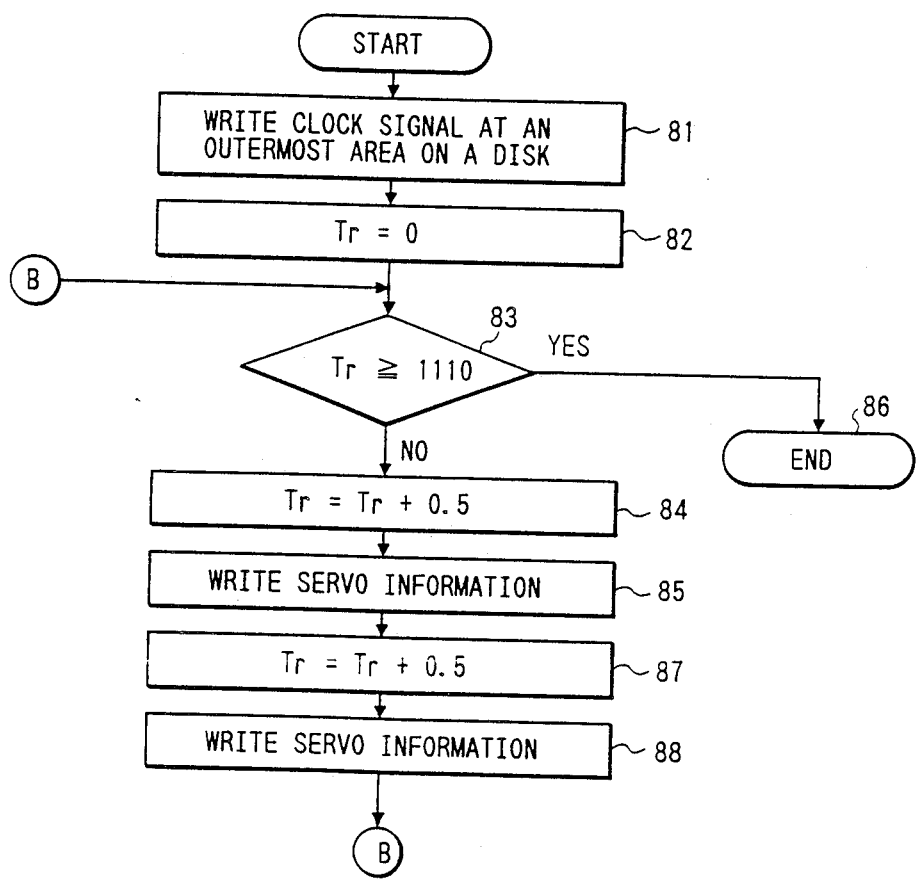
FIG. 8 is a flow chart illustrating the procedure for writing servo information onto the magnetic disk apparatus according to the embodiment of FIG. 1.

FIG. 8 is a flow chart for illustrating the operation of writing servo information by the magnetic disk apparatus 75 of FIG. 7.

First, a clock signal for writing servo information is written on the outermost area of the disk 21 (81). next, the track number Tr is set to 0 (82), and the magnetic head 22 is moved inwardly by a half track (84). The DC erase portion 1, index portion 4, track address portion 5, timing signal portions 2, 6, and 8, and the A signal of the burst signal portion 7 shown in FIG. 1, are written onto the disk 21 (85). At this moment, the B portion of the burst signal portion 7 of FIG. 1 is erased. This is carried out over a whole rotation of the track. Next, the magnetic head 22 is moved inwardly by a half track (87) in order to write on the disk 21 the DC erase portion 1, index portion 4, track address portion 5, timing signal portions 2, 6 and 8, and the B signal of the burst signal portion 7. At this moment, the A portion of the burst signal portion 7 is erased. Then, the procedure returns back to step 83 and is repeated until the 1110th track, which is the innermost track, is reached.

Figure 9:
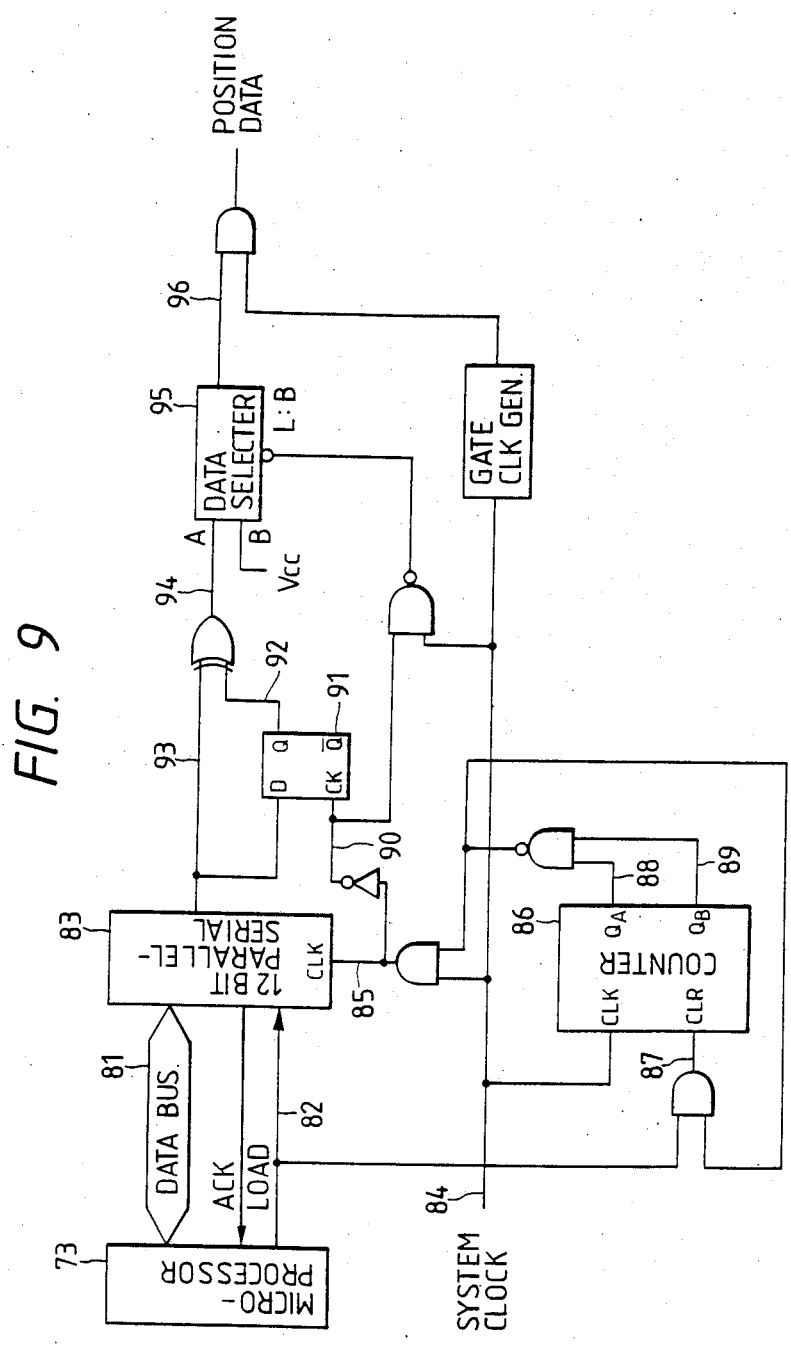
FIG. 9 is a block diagram of the servo information write apparatus shown in FIG. 7.
Figure 10:
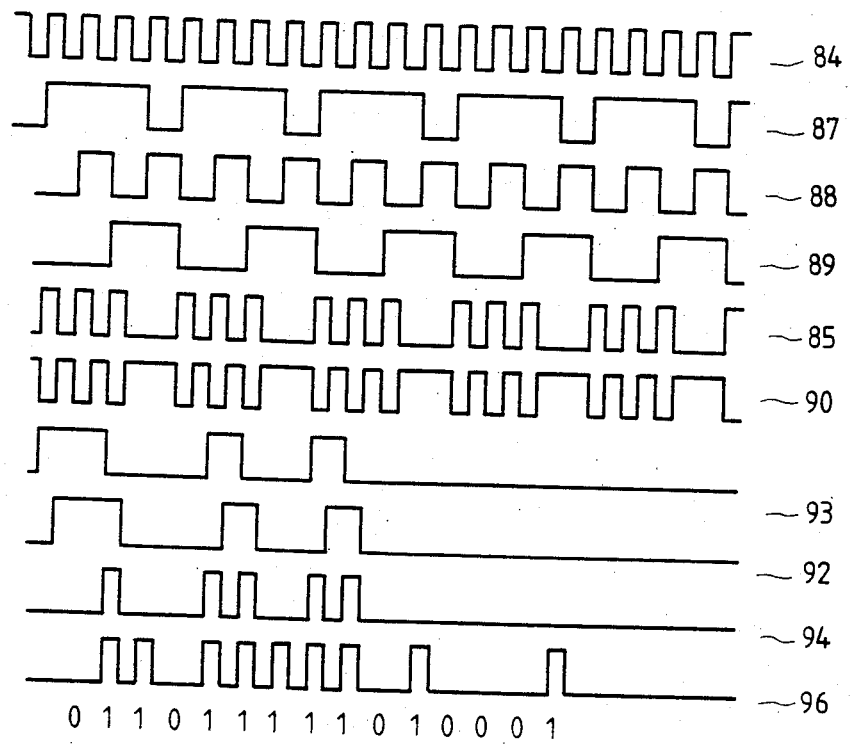
FIG. 10 is a timing chart illustrating the operation of the servo information write apparatus of FIG. 9.

The servo information writing device 70 of FIG. 8 will now be described in conjunction with FIGS. 9 and 10. In FIG. 9, the Gray coded track number is issued from a microprocessor 73, and the circuit operation is triggered by a load instruction 82 from the microprocessor 73. As the load instruction 82 assumes a high level, the 4-bit counter 86 begins its timing procedure for forming dummy bits. The 4-bit counter 86 is used for forming the dummy bit that is interleaved after every four bits of the track address signal. The track address signal that is to be written is sent from the microprocessor 73 to the parallel-serial converter 83. The signals that are sent consist of a binary code sequence where the track address signals are expressed by Gray codes.

The output signal 93 of the parallel-serial converter 83 is delayed using the inverted signal 90 of the system clock as a clock signal for the D-type flip-flop 91. A Gray code sequence 94 having spaces for interleaving dummy bits is formed based on the exclusive logical sum of the output signal 92 of the D-type flip-flop 91 and the output signal 93 of the parallel-serial converter 83. A data selector 95 adds a high-level signal, i.e., adds a dummy bit to the newly formed Gray code sequence 94 after every low level clear signal 87 to the counter 86, so that a Gray code sequence 96 including dummy bits is formed. FIG. 10 is a timing chart for forming, for example, track address signals of a track No. 3232 using the circuit of FIG. 9.

According to the embodiment described above, dummy bits are interleaved in a Gray code sequence to limit the number of "0s" that appear consecutively thereby limiting the length of the DC erase portion where there is a string of "0s". As the length of the DC erase portion 3 becomes shorter than that of its conventional counterpart, the memory capacity of the user area can be increased accordingly. Furthermore, the magnetic head 22 is prevented from erroneously detecting the DC erase portion 3 as the track address portion 5, i.e., the magnetic head is positioned maintaining high precision. Furthermore, even when the dummy bits are interleaved in the Gray code sequence, the demodulator and the reader can be simply constructed without appreciably decreasing the operation speed.

In this embodiment, the dummy bit is interleaved after every three bits. However, the invention need not be limited to this number. Namely, the interval for interleaving the dummy bit may be selected to be larger depending upon the number of bits in the DC erase portion 3.

Moreover, though the dummy bits were interleaved one by one while maintaining an equal interval, the invention is in no way limited to this method only. The interval for interleaving the dummy bit may be suitably determined depending upon the constitution of the demodulator, such as the counter that is used.

Furthermore, with the interval for interleaving the dummy bit being shorter than the length of "0" bits that appear consecutively in the burst signal portion 7, the track address portion 5 is prevented from being erroneously recognized as the burst signal portion 7.

In the demodulator of this embodiment, furthermore, the dummy bits are removed using a 4-bit counter. The dummy bits, however, can also be removed if a value of a predetermined stage is produced using only a flip-flop.

Described below is a second embodiment of the present invention in conjunction with FIG. 11.

In the second embodiment, not only the user data but also the servo information are recorded in 1–7 RLL codes.

If signals expressed in conventional Gray codes are simply modified into signals of the 2–7 RLL system, the Gray code property of the track address differing from a neighboring track by one bit position is no longer maintained. In this embodiment, therefore, conventional Gray code signals with included dummy bits are used as intermediate codes which are then modified through a 2–7 modifier and written onto the disk 22. At the time of reading, the modification is effected in an opposite way. That is, track address signals of the 2–7 signal form are decoded into intermediate codes. Then the dummy signals are removed which decodes them into the initial Gray codes. The track address is then recognized using these Gray codes.

Figure 11:
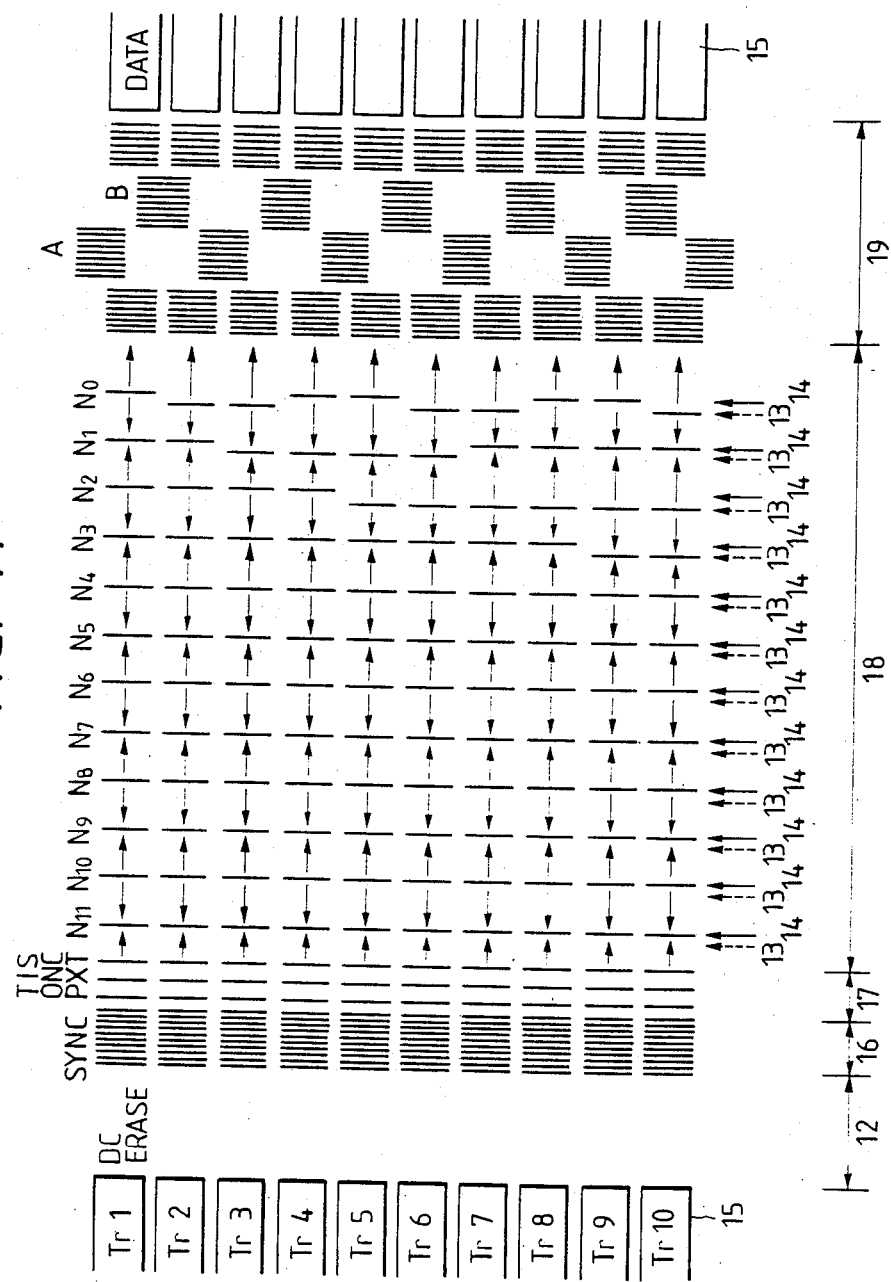
FIG. 11 is a diagram for closely explaining servo information recorded on a magnetic disk apparatus according to a second embodiment of the present invention.

FIG. 11 is a diagram for explaining in detail the servo information signals of a sector according to the second embodiment.

One sector is constituted by a DC erase signal portion 12 in which several "0" bits lie consecutively to indicate the beginning of the sector, a timing signal portion 16 for determining the timing for reading, an index signal portion 17 including signals that indicate a head sector, a track address signal portion 18 consisting of 12 block $N_{11}$ to $N_0$ where a track number is written in a 2-7 RLL code, a burst signal portion 19 for finely positioning the head, and a user area 15 on which the data is recorded by the user.

The timing signal portion 16 detects the continuation of the signals after the DC erase signal portion 12 to recognize the beginning of the sector. Therefore, the DC erase signals need not be decoded, and a string of "1" bits is written that does not appear in the 2-7 RLL signals.

An index signal for detecting the number of the sector on the track is written on the index signal portion 17.

Each block in the track address signal portion 18 is written in a 2-7 RLL code which consists of four bits. Among them, whether a "1" bit is located at position 13 or 14 determines whether the block indicates a "1" bit or a "0" bit. In this embodiment as shown in FIG. 11, these signals are written in a manner that the signal at the position 13 is different by only one from the neighboring track.

The burst signal portion 19 works to compare the read gains of the A signals and the B signals that are used to correctly locate the magnetic head 22 at the center of the track, and to recognize whether the magnetic head 22 is positioned at the center on the track. The burst signals are not decoded and need not be 2-7 RLL codes but may be a continuations of signals of, for example, "1" bits.

Described below is how to prepare the track address signals in conjunction with FIG. 12. The track number 100 is modified into a Gray code sequence 101. Dummy bits 103 are then added to the Gray codes to prepare intermediate codes 102. In this embodiment, a "1" bit is added in front of each of the bits thereby to obtain intermediate codes 102. Finally, the intermediate codes 102 are modified into 2-7 RLL codes (hereinafter referred to as "2-7 modification") to obtain a recording pattern 104 that is to be recorded on the disk 21. In the recording pattern 104, there is a one bit position 105 difference between, for example, track 1 and track 2, and the property of Gray codes is maintained even after the 2-7 modification.

Figure 12:
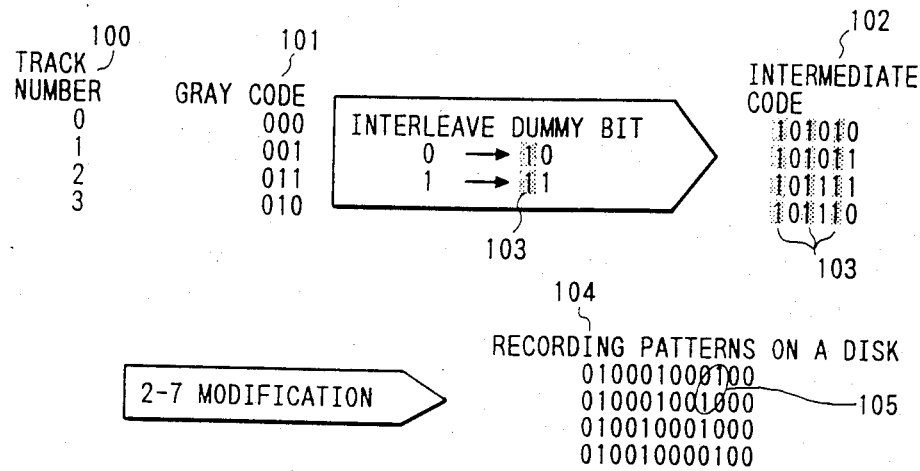
FIG. 12 is a diagram for explaining how to prepare servo information, for the magnetic disk apparatus according to the embodiment of FIG. 11.

FIG. 12 deals with the case where the Gray code is constituted by three bits. In a practical apparatus, however, there are more than 1100 tracks and in which case the Gray code 101 must be comprised of more than 12 bits. Similarly, it need not be pointed out that the intermediate code 102 and the recording pattern 104 of the disk 21 must be made up of an increased number of bits depending upon the Gray code 101.

Figure 13:
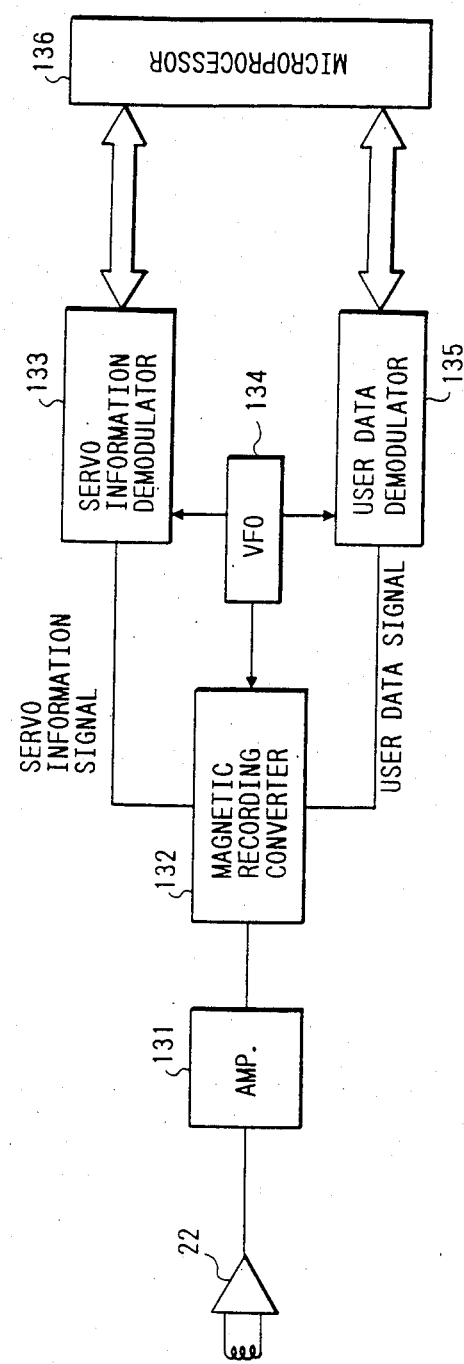
FIG. 13 is a block diagram of the demodulator in the magnetic disk apparatus according to the second embodiment of FIG. 11.

The signal demodulator will now be explained in conjunction with FIG. 13. The signal demodulator is realized by directly using the magnetic recording converter that is used for demodulating the user data signals.

The analog signals read from the magnetic head 22 are amplified through an amplifier 131. The amplified analog signals are converted into digital signals by a magnetic recording converter 132. When the digitized signals are servo signals, the 2-7 RLL codes are decoded through a servo signal demodulator 133 and are then converted into binary signals after dummy signals have been removed. The servo signal demodulator 133 can be simply constituted by adding a widely known 2-7 RLL code decoder to the servo signal demodulator 44 of FIG. 4. The servo information is recognized by a microprocessor 136. When the signals of the demodulator are user data, the 2-7 RLL codes are decoded through the user data demodulator 135 and are sent to the microprocessor 136.

In this embodiment, both the servo information and the user data are recorded using the same system, i.e., are recorded by using 2-7 RLL codes, enabling the VFO 134 to be commonly used. In this embodiment, furthermore, though both the servo signal demodulator 133 and the user data demodulator 135 are, respectively, provided with a circuit for decoding the 2-7 RLL codes, it is also allowable to commonly use the circuit that decodes the 2-7 RLL codes.

Figure 14:
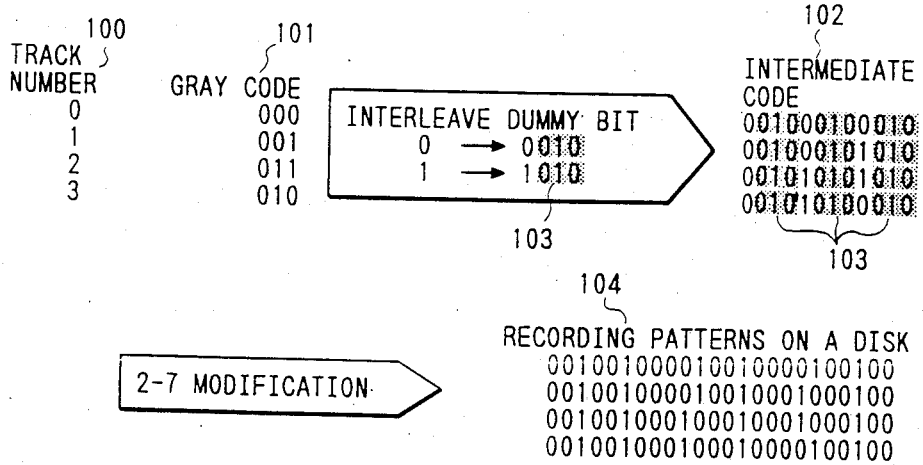
FIGS. 14 to 16 are diagrams explaining how to prepare other servo information for the magnetic disk apparatus according to the embodiment of FIG. 11.
Figure 15:
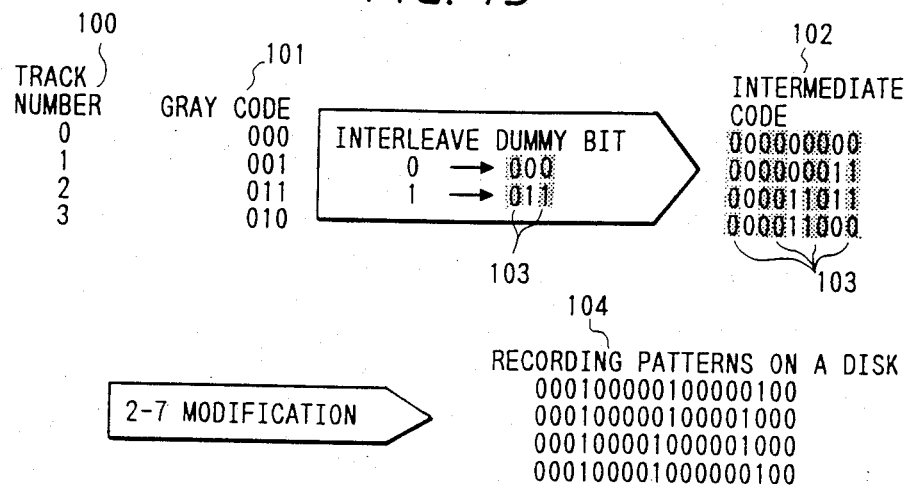
Figure 16:
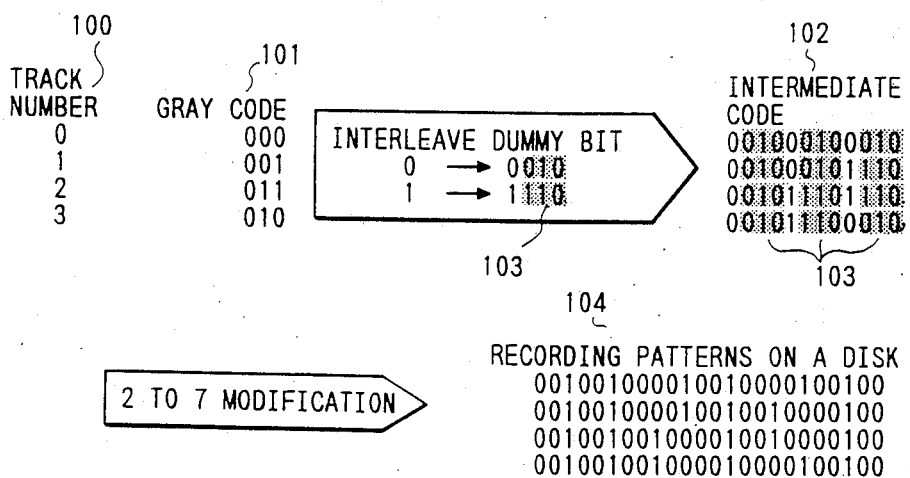

Described below, in conjunction with FIGS. 14, 15 and 16, is another method of forming track address signals 18 according to the second embodiment.

FIG. 14 shows an example where an intermediate code is formed by adding bits "010" after each of the bits of the Gray code, and FIG. 15 shows an example where an intermediate code is formed by adding a "0" bit in front of each of the bits of the Gray code and then adding bits which are the same as the bits of the Gray code. FIG. 16 shows an example having a 0-length greater than that of the example of FIG. 14. In the example of FIG. 16, the same bit is added after each bit of the Gray code followed by the addition of the bits "10".

The method of interleaving dummy bits according to this embodiment is not only limited to the aforementioned examples, but may be realized in any form provided that the code on a given track is different by only one position from the code on a neighboring track after the intermediate code is subjected to the 2-7 modification.

According to the second embodiment as described above, the dummy bit "1" is interleaved for each bit of Gray code, and then the signal is subjected to the 2-7 modification in order to realize a Gray code of 2-7 RLL code. The 2-7 signal is so specified that the "0" bits continue from 2 to 7. Therefore, if the 0 signal in the DC erase portion has a sufficiently large length consisting of 8 or more "0" bits, the track address signal 18 will not be erroneously recognized as a DC erase signal 12. Furthermore, this embodiment allows the magnetic recording converter 132 to be used for both the servo information and the user information.

Though the illustrated embodiment has used 2-7 RLL codes, it need not be pointed out that the same effects are also obtained when other RLL codes are used.

What is claimed is:

1. A magnetic disk apparatus comprising:
   at least one disk having a plurality of tracks, each track being divided into a plurality of sectors to record data thereon;
   each sector having written at the head thereof a DC erase signal to indicate the beginning of the sector and a position information signal written thereon to indicate the position of said sector, said position information signal being a signal that indicates with a plurality of bits in Gray code a track number on which said sector is positioned with a dummy bits interleaved between predetermined numbers of bits of said Gray code;

a transducer for writing data onto said disk and reading data and the information at the head of each sector from said disk;

an actuator for positioning said transducer on a predetermined track; and a microprocessor coupled to receive said data and information which is read and adapted to recognize said position information signal read by said transducer and control the motion of said actuator according to said position information that is recognized.

2. A magnetic disk apparatus according to claim 1, wherein said dummy signal comprises one bit interleaved in said Gray code after every three bits thereof.

3. A magnetic disk apparatus according to claim 1, wherein said position information signal includes a plurality of burst signals for finely positioning the magnetic head.

4. A magnetic disk apparatus comprising:
a disk having a data recording area which is divided into a plurality of concentric tracks, each track having a plurality of predetermined sectors each sector having a track address signal;
said track address signal including a dummy signal such that a predetermined signal pattern will not appear consecutively in the track address signal;
a transducer for writing data onto said disk and for reading data and said track address signal from said disk;
means for positioning said transducer on a predetermined track of said disk;
means for removing said dummy signal from the track address signal that is read by said transducer;
a decoder decoding the track address signal from which said dummy signal has been removed; and
means for controlling said positioning means in dependence upon said decoded track address signal.

5. A magnetic disk apparatus according to claim 4, wherein said track address signal includes a signal that indicates a track number in Gray code into which said dummy signal is interleaved 6. A magnetic disk apparatus according to claim 5, wherein said track address signal is recorded on said disk in an NRZI (non-return-zero invert) system.

7. A magnetic disk apparatus according to claim 5, said track address signal is recorded on said disk in an RLL (run-length-limited) code.

8. A magnetic disk apparatus comprising:
a disk having a plurality of tracks, each track divided into a plurality of sectors of predetermined length, each sector having an area for recording an address signal that indicates the track number on which the sector is positioned and having a user area for recording user data;
said address signal and said user data both being written in RLL code on said disk,
a transducer for writing user data onto said disk and for reading user data and said address from said disk;
an actuator for positioning said transducer onto a predetermined position on said disk;
a decoder for decoding said address signal and said user data read by said transducer from the RLL codes into binary codes; and
a controller which detects the position of said transducer on said disk based on said binary code and controls said actuator the position said transducer.

9. A magnetic disk apparatus according to claim 8, wherein the address signals written in RLL code are recorded on said sectors in such a way that the position of a signal representing bit "1" is different by only one from the address signal recorded on the sector of the neighboring track.

10. A magnetic disk apparatus according to claim 9, wherein said address signal is derived from a track number in Gray code.

11. In a magnetic disk apparatus comprising a disk having a plurality of tracks, each track divided into a plurality of sectors of a predetermined length, means for coding signals written on said disk according to a predetermined coding method and a transducer for writing said coded signals onto said disk, a method of recording position information pertaining to the sectors on the disk comprising:
expressing the position information in binary code;
modifying said binary code into Gray code;
forming an intermediate code by interleaving a dummy code that cannot be decoded into said Gray code;
coding said intermediate code to obtain said predetermined code using said coding means; and
recording said coded signals as position information onto the head portions of said sectors using said transducer.

12. A method of recording position information according to claim 11, wherein said position information indicates a track number on which said sector is positioned.

13. A method of recording position information according to claim 11, wherein said predetermined coding method is a NRZI (non-return-zero invert) system.

14. A method of recording position information according to claim 13, wherein said dummy code is a bit of valve "1" that is interleaved after every predetermined number of bits of Gray code.

15. A method of recording position information according to claim 11, wherein said predetermined coding method is an RLL (run-length-limited) code.

16. A method of recording position information according to claim 15, wherein said RLL code is a 2-7 RLL code.

17. A method of recording position information according to claim 16, wherein said dummy code is a bit of valve "1" that is interleaved in front of each bit of said Gray code.

18. A magnetic disk apparatus comprising:
a disk having a region for storing data which is divided into a plurality of sector units, each sector having written thereon a position information signal including a dummy signal;
a transducer for writing data onto said magnetic recording medium and for reading data and said position information from said magnetic recording medium;
means for converting said position information signal read by said magnetic head into a digital signal;
means for removing said dummy signal from the position information signal converted by said converting means;

a decoder decoding the position information signal from which the dummy signal has been removed into a binary code;

means for recognizing the position of said transducer on said disk based on the binary code decoded by said decoder; and means for positioning said transducer in dependence upon the position recognized by said recognizing means.

19. A magnetic disk apparatus according to claim 18, wherein said position information signal is formed by interleaving a dummy code in a Gray code that represents a track number after predetermined intervals.

* * * * *

UNITED STATES PATENT AND TRADEMARK OFFICE
CERTIFICATE OF CORRECTION

PATENT NO. :
DATED : 4,984,100
INVENTOR(S) : 8 January 1991
Norikazu TAKAYAMA et al.

It is certified that error appears in the above-identified patent and that said Letters Patent is hereby corrected as shown below:

| Column | Line | |
|---|---|---|
| 7 | 38 | Change "next" to --Next--. |
| 8 | 55 | Change "are recorded" to --is recorded |
| 9 | 38 | Change "continuations" to --continuation--. |
| 9 | 56 | After "tracks" insert --,-- and delete "and" |
| 11 | 4 | Before "dummy" delete "a". |
| 11 | 48 | After "interleaved" insert --.--. |
| 12 | 6 | Delete "the position" and insert --positioning--. |

Signed and Sealed this

Fourth Day of August, 1992

Attest:

DOUGLAS B. COMER

*Attesting Officer*     *Acting Commissioner of Patents and Trademarks*